United States Patent
Zhang

(10) Patent No.: US 11,763,431 B2
(45) Date of Patent: Sep. 19, 2023

(54) SCENE-BASED IMAGE PROCESSING METHOD, APPARATUS, SMART TERMINAL AND STORAGE MEDIUM

(71) Applicant: SHENZHEN TCL NEW TECHNOLOGY CO., LTD., Shenzhen (CN)

(72) Inventor: Xiaodong Zhang, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 370 days.

(21) Appl. No.: 17/266,915

(22) PCT Filed: Dec. 26, 2019

(86) PCT No.: PCT/CN2019/128487
§ 371 (c)(1),
(2) Date: Feb. 8, 2021

(87) PCT Pub. No.: WO2020/135538
PCT Pub. Date: Jul. 2, 2020

(65) Prior Publication Data
US 2021/0342595 A1 Nov. 4, 2021

(30) Foreign Application Priority Data

Dec. 29, 2018 (CN) .......................... 201811639705.2

(51) Int. Cl.
*G06T 5/00* (2006.01)
*H04N 19/159* (2014.01)
(Continued)

(52) U.S. Cl.
CPC .............. *G06T 5/009* (2013.01); *G06F 18/22* (2023.01); *G06T 5/001* (2013.01); *G06T 5/50* (2013.01);
(Continued)

(58) Field of Classification Search
CPC .. H04N 19/142; H04N 19/87; H04N 21/8455; G06T 2207/10016; G06T 5/40; G06T 5/001; G06V 20/40; G06V 20/46
See application file for complete search history.

(56) References Cited

U.S. PATENT DOCUMENTS

| | | | |
|---|---|---|---|
| 2003/0020743 A1* | 1/2003 | Barbieri | G06V 20/40 |
| 2012/0147953 A1* | 6/2012 | El-Mahdy | H04N 19/44 375/240.03 |
| 2014/0086557 A1 | 3/2014 | Yu et al. | |

FOREIGN PATENT DOCUMENTS

| | | |
|---|---|---|
| CN | 101945223 A | 1/2011 |
| CN | 105139421 A | 12/2015 |

(Continued)

OTHER PUBLICATIONS

Oskarsson, Magnus. "Temporally consistent tone mapping of images and video using optimal k-means clustering." Journal of mathematical imaging and vision 57 (2017): 225-238.*

(Continued)

*Primary Examiner* — Li Liu
(74) *Attorney, Agent, or Firm* — Nathan & Associates; Menachem Nathan

(57) ABSTRACT

A scene-based image processing method includes: performing decoding after acquiring video data to obtain multiple image frames, and identifying key frame images by performing key frame detection (S10); analyzing similarity between the content of two adjacent key frame images, and determining whether the difference in the content of the two adjacent key frame images is within a preset threshold (S20); and when the difference in the content of the two adjacent key frame images is within the preset threshold, determining that the two adjacent key frame images are a same scene, uniformly performing image feature statistics compilation, overlaying feature information, and performing (Continued)

image enhancement on a same scene by using a similar enhancement processing curve (S30).

16 Claims, 2 Drawing Sheets

(51) Int. Cl.
| | |
|---|---|
| H04N 19/172 | (2014.01) |
| H04N 19/46 | (2014.01) |
| H04N 19/87 | (2014.01) |
| G06T 5/50 | (2006.01) |
| G06T 9/00 | (2006.01) |
| G06V 20/40 | (2022.01) |
| G06F 18/22 | (2023.01) |

(52) U.S. Cl.
CPC ............... *G06T 9/00* (2013.01); *G06V 20/46* (2022.01); *H04N 19/159* (2014.11); *H04N 19/172* (2014.11); *H04N 19/46* (2014.11); *H04N 19/87* (2014.11); *G06T 2207/10016* (2013.01); *G06T 2207/20224* (2013.01)

(56) References Cited

FOREIGN PATENT DOCUMENTS

| CN | 105631422 A | 6/2016 |
|---|---|---|
| CN | 106937114 A | 7/2017 |

OTHER PUBLICATIONS

Eilertsen, Gabriel, Rafal Konrad Mantiuk, and Jonas Unger. "A comparative review of tone-mapping algorithms for high dynamic range video." Computer graphics forum. vol. 36. No. 2. 2017.*

Boschetti, Alberto, et al. "An optimal Video-Surveillance approach for HDR videos tone mapping." 2011 19th European Signal Processing Conference. IEEE, 2011.*

Kang, Eung Kwan, Sung Joo Kim, and Joon Soo Choi. "Video retrieval based on scene change detection in compressed streams." IEEE Transactions on Consumer Electronics 45.3 (1999): 932-936.*

Extended European Search Report dated Aug. 26, 2022 From European Patent Office Re. Application No. EP19902496.9.

Anustup Chohdhury et al: "A Framework for Robust Online Video Contrast Enhancement Using Modularity Optimization", IEEE Transactions on Circuits and Systems for Video Technology, IEEE, USA, vol. 22, No. 9, Sep. 1, 2012 (Sep. 1, 2012), pp. 1266-1279, XP011459684, ISSN: 1051-8215, DOI: 10.1109/TCSVT.2012. 2198136.

The World Intellectual Property Organization (WIPO) International Search Report for PCT/CN2019/128487 dated Apr. 2, 2020 6 Pages (including translation).

\* cited by examiner

SCENE-BASED IMAGE PROCESSING METHOD, APPARATUS, SMART TERMINAL AND STORAGE MEDIUM

CROSS-REFERENCES TO RELATED APPLICATIONS

This application is a national stage application of PCT Patent Application No. PCT/CN2019/128487, filed on Dec. 26, 2019, which claims priority to Chinese Patent Application No. 201811639705.2, filed on Dec. 29, 2018, the content of all of which is incorporated herein by reference.

FIELD OF THE INVENTION

The present disclosure relates to the field of image processing technology, and in particular to a scene-based image processing method, apparatus, smart terminal and storage medium.

BACKGROUND

In image enhancement processing (enhancing an useful information in the image, it can be a distorted process, its purpose is to improve visual effect of an image for an application of a given image), it is often necessary to analyze characteristics (such as brightness distribution, average brightness, etc.) of video content, and apply different enhancement processing curves according to characteristic parameters of the video content to perform image enhancement processing, purposefully highlight the overall or local characteristics of the image, and turn an original unclear image into clear one or highlight certain features that viewer is interested in, expand the difference between the features of different objects in the image, suppress features viewer is not interested in, so as to improve image quality, enrich the amount of information, strengthen image interpretation and recognition effects, and meet need of a plurality of special analysis.

For example, when applying an image enhancement algorithm based on a brightness histogram, it is necessary to calculate the brightness distribution information of each frame in the image, and then based on enhancement algorithm, according to histogram distribution of each frame, applying different enhancement curves on the images, and then realize enhancement of the image. For real-time image enhancement systems, performing histogram statistics will take up part of the resources, and applying histogram statistics on each frame of image will slow down an operation of a system, frequently transforming an enhancement curve will also make the image unstable.

Therefore, the current technology needs to be improved and developed.

BRIEF SUMMARY OF THE DISCLOSURE

According to the above described defects, the purpose of the present disclosure is to provide a scene-based image processing method, apparatus, smart terminal and storage medium, aiming to extract key-frame images, merely need to perform video feature analysis and statistics on the key-frame images to obtain statistic information, the entire same scenes are enhanced through using a same enhancement processing curve, thereby greatly saving resources and benefiting system stability.

A technical solution of the present disclosure to solve technical problems is as follows:

A scene-based image processing method, wherein, the method comprising:
  performing decoding after acquiring video date to obtain a plurality of frame images, and performing key-frame detection to identify key-frame images;
  analyzing a similarity between a content of two adjacent key-frame images, and determining whether a difference in the content of two adjacent key-frame images is within a preset threshold;
  and when the difference in the content of two adjacent key-frame images is within the preset threshold, determining the two adjacent key-frame images are a same scene, uniformly performing image feature statistics and superimposing feature information, and performing image enhancement processing on a same scene through using a same enhancement processing curve.

The scene-based image processing method, wherein, after analyzing a similarity between a content of two adjacent key-frame images, and determining whether a difference in the content of the two adjacent key-frame images is within the preset threshold, the method further comprising:
  when it is determined that the difference in the content of the two adjacent key-frame images exceeds the preset threshold, determining the two adjacent key-frame images are different scenes, and respectively performing image feature statistics, performing image engagement processing on image features of different scenes through a corresponding enhancement processing curve.

The scene-based image processing method, wherein, the method further comprising:
  at an intersection of changing scenes, applying an image enhancement algorithm to smooth an enhancement processing curve of two scenes before and after the change.

The scene-based image processing method, wherein the method further comprising:
  after determining two adjacent key-frame images are different scenes, and respectively performing image feature statistics, controlling feature information not to be superimposed.

The scene-based image processing method, wherein, the method further comprising:
  when detecting a key-frame, obtaining a key-frame image through identifying a fixed flag bit in code stream.

The scene-based image processing method, wherein, the key-frame is formed by intra frame compression, and a compression rate is the lowest.

The scene-based image processing method, wherein, an animation between the two key-frames is a transition frame or an intermediate frame, and the transition frame or the intermediate frame is created by software.

A scene-based image processing apparatus, wherein, the apparatus comprising:
  a video decoding module, used to perform decoding after acquiring video date to obtain a plurality of frame images;
  a key-frame recognition module, used to perform key-frame detection after decoding code and identify key-frame images;
  a scene analysis module, used to analyze a similarity between a content of two adjacent key-frame images, and determine whether a difference in the content of the two adjacent key-frame images is within a preset threshold;

an image analysis module, used to uniformly perform image feature statistics on a same scene and superimpose feature information;

an image enhancement module, used to perform image enhancement processing on the same scene through using a same enhancement processing curve.

The scene-based image processing apparatus, wherein, the image analysis module is also used to perform image feature statistics on different scenes respectively and control feature information not to be superimposed.

The scene-based image processing apparatus, wherein, the image enhancement module is also used to perform image engagement processing on image features of different scenes through a corresponding enhancement processing curve.

The scene-based image processing apparatus, wherein, the image enhancement module is also used to apply an image enhancement algorithm to smooth an enhancement processing curve of two scenes before and after a change at an intersection of changing scenes.

The scene-based image processing apparatus, wherein, the key-frame recognition module further comprises a key-frame image acquisition unit, the key-frame image acquisition unit is used to obtain a key-frame image through identifying a fixed flag bit in code streaming during key-frame detection.

The scene-based image processing apparatus, wherein, the key-frame is formed by intra frame compression, and a compression rate is the lowest.

The scene-based image processing apparatus, wherein, an animation between the two key-frames is a transition frame or an intermediate frame, and the transition frame or the intermediate frame is created by software.

A smart terminal, wherein, the smart terminal comprising: a memory, a processor, and a scene-based image processing program stored on the memory and capable of running on the processor, the scene-based image processing program is executed by the processor to implement the steps of the scene-based image processing method described above.

A storage medium, wherein, the storage medium stores a scene-based image processing program, and the scene-based image processing program is executed by a processor to implement the steps of the scene-based image processing method described above.

The present disclosure discloses a scene-based image processing method, apparatus, smart terminal and storage medium, the method comprising: performing decoding after acquiring video date to obtain a plurality of frame images, and performing key-frame detection to identify key-frame images; analyzing similarity between the content of two adjacent key-frame images, and determining whether the difference in the content of the two adjacent key-frame images is within a preset threshold; when the difference in the content of the two adjacent key-frame images is within the preset threshold, determining that the two adjacent key-frame images are a same scene, uniformly performing image feature statistics and superimposing feature information, and performing image enhancement processing on a same scene through using a same enhancement processing curve. By extracting key-frame images, the present disclosure merely needs to perform video feature analysis and statistics on a key-frame images to obtain statistic information, the entire same scenes are enhanced through using a same enhancement processing curve, thereby greatly saving resources and benefiting system stability.

DETAILED DESCRIPTION OF EMBODIMENTS

The present disclosure is providing a channel switching method for digital television, storage device, and digital television. In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Embodiment 1

Figure 1:
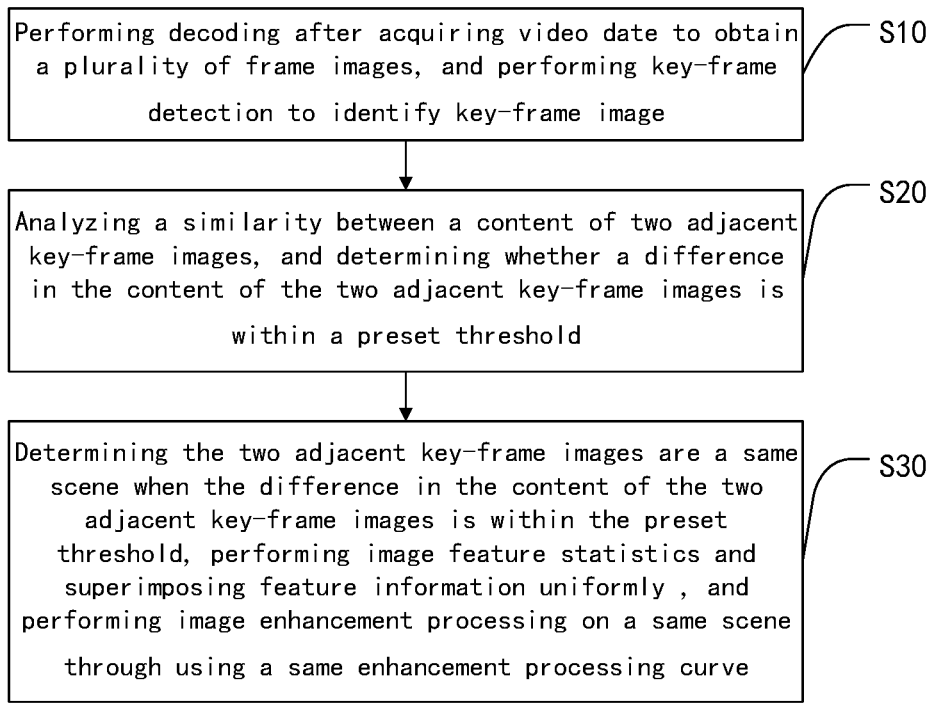
FIG. 1 illustrates a flow chart on an embodiment of a scene-based image processing method provided by the present disclosure.

A scene based image processing method described in the embodiment of the present disclosure, as shown in FIG. 1, comprises the following steps:

S10, performing decoding after acquiring video date to obtain a plurality of frame images, and performing key-frame detection to identify key-frame images;

Specifically, the traditional histogram statistics process is: after decoding a video data, applying a histogram statistics unit to perform statistics on each frame of the decoded image content, and providing statistical information to image enhancement algorithm for image enhancement processing.

The difference in present disclosure is that after decoding a video, adding a key-frame recognition step to identify a key-frame image. The key-frame in present disclosure is the key-frame based on a principle of image compression encoding; wherein, a frame is the smallest unit of a single image in an animation (a video), which is equivalent to each frame of scene in the movie, and a frame is represented as a grid or a mark on the time axis of animation software, and a key-frame is equivalent to an original image in two-dimensional animation, it refers to a frame where a key action (moving or changing of a character or an object) located in, an animation between two key-frames can be created by software, which is called a transition frame or an intermediate frame.

Further, identifying a key-frame does not require too much image analysis to obtain, a key-frame have a fixed flag bit in code stream, and a plurality of key-frame images can be obtained through identifying the flag bits; that is, when performing key-frame detection, the key-frame images can be obtained through identifying the fixed flag bits in code streaming.

Taking H.264 encoding as an example, three types of frames are defined in H264 protocol, namely I-frame, P-frame, and B-frame. I-frame is a complete frame, that is, a key-frame formed by intra frame compression, with a lowest compression rate, a complete image, and P-frame and B-frame are directly or indirectly generated from this I-frame, what they transmit are not the complete image data, but a data different from an image of the adjacent frame, which belongs to intra frame compression.

After one I-frame, the image content before next I-frame does not change much. Therefore, when performing histogram statistics, it is possible to perform feature information statistics on only key I-frame images.

Take a 120-minute H.264 movie as an example, the movie has a total of 172800 frames, about one I-frame every 3-4 seconds, and about 2000 I-frames. According to traditional histogram statistical method, having to calculate a total 172800 frames one by one, while adopting key-frame statistics method, it merely needs to calculate about 2000 frames, which greatly saving resources.

S20, analyzing the similarity between the content of two adjacent key-frame images, and determining whether the difference in the content of the two adjacent key-frame images is within a preset threshold.

For example, an image sequence IBBPBBIBPBPI, if the difference between first key-frame I and second key-frame I is not significant, and does not reach a preset threshold (within a preset threshold), it is considered to be a same scene, if the difference between second key-frame I and third key-frame I is significant, reaches (exceeds) a preset threshold, it is considered to be a different scene (different scenes mean that an image content is quite different).

S30, when the difference in the content of two adjacent key-frame images is within a preset threshold, determining that two adjacent key-frame images are a same scene, uniformly performing image feature statistics and superimposing feature information, and performing image enhancement processing on a same scene through using a same enhancement processing curve.

Specifically, when first key-frame I and second key-frame-I are in a same scene, performing image feature statistics on two of I-frames, superimposing feature information, and generating an enhancement processing curve for this scene, adopting a same enhancement processing curve to a same scene; as in above sequence, the difference between second key-frame I and third key-frame I are significant, when reaching a preset threshold, it is considered to be a different scene, for the different scenes, respectively performing image feature statistics on a plurality of I-frames of sequence, does not superimpose feature information, performing image engagement processing on image features of different scenes through the different enhancement processing curve.

The present disclosure obtains some image frames (I-frame, P-frame, B-frame) after the video being decoded. Identifying key I-frames and performing a similarity analysis of the key I-frames, if a difference is within a preset threshold then the frames are the same scenes or the frames are different scenes. Performing statistical analysis on a feature information (brightness histogram etc.) of the same scenes, and generating a image enhancement curve by image enhancement algorithm according to the statistical result to realize image enhancement.

The present disclosure further reduces the use times of enhancement curves, and only applies different enhancement curves in different scenes, thus avoiding the risk of flicker caused by frequent changes of enhancement image curves. In order to further reduce the influence of above-mentioned picture flicker, applying an image enhancement algorithm to smooth an enhancement curve used in two scenes at an intersection of changing scenes, and adopting gradual change method to prevent the large mutations, then avoid pixel flickering.

Further, for an analysis of other characteristic parameters of image information, such as brightness distribution, image maximum brightness, minimum brightness, and average brightness statistics, the above process can also be used.

Embodiment 2

Figure 2:
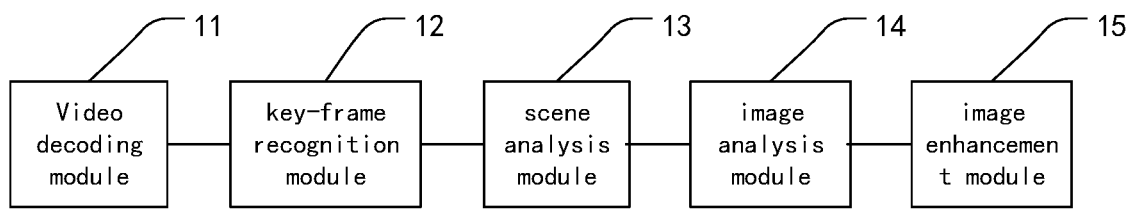
FIG. 2 illustrates a structure principle chart on an embodiment of a scene-based image processing apparatus provided by the present disclosure.

Further, as shown in FIG. 2, based on above-mentioned scene-based image processing method, the present disclosure also correspondingly provides a scene-based image processing apparatus, and the apparatus comprising:

A video decoding module 11, used to perform decoding after acquiring video date to obtain a plurality of frame images; A key-frame recognition module 12, used to perform key-frame detection after decoding code and identify key-frame images; a scene analysis module 13, used to analyze similarity between the content of two adjacent key-frame images, and determine whether the difference in the content of the two adjacent key-frame images is within a preset threshold; an image analysis module 14, used to uniformly perform image feature statistics on a same scene and superimpose feature information; an image enhancement module 15, used to perform image enhancement processing on a same scene through using a same enhancement processing curve.

Further, the image analysis module 14 is also used to perform image feature statistics on different scenes respectively and control feature information not to be superimposed.

Further, the image enhancement module 15 is also used to perform image engagement processing on image features of different scenes through a corresponding enhancement processing curve.

Further, the image enhancement module 15 is also used to apply an image enhancement algorithm to smooth an enhancement processing curve of two scenes before and after a change at an intersection of changing scenes.

Further, the key-frame recognition module 12 further comprises a key-frame image acquisition unit, the key-frame image acquisition unit used to obtain a key-frame image through identifying a fixed flag bit in code streaming during key-frame detection.

Further, the key-frame recognition module 12 is formed by intra frame compression, and a compression rate is the lowest.

Further, an animation between the two key-frames is a transition frame or an intermediate frame, and the transition frame or the intermediate frame is created by software.

Embodiment 3

Figure 3:
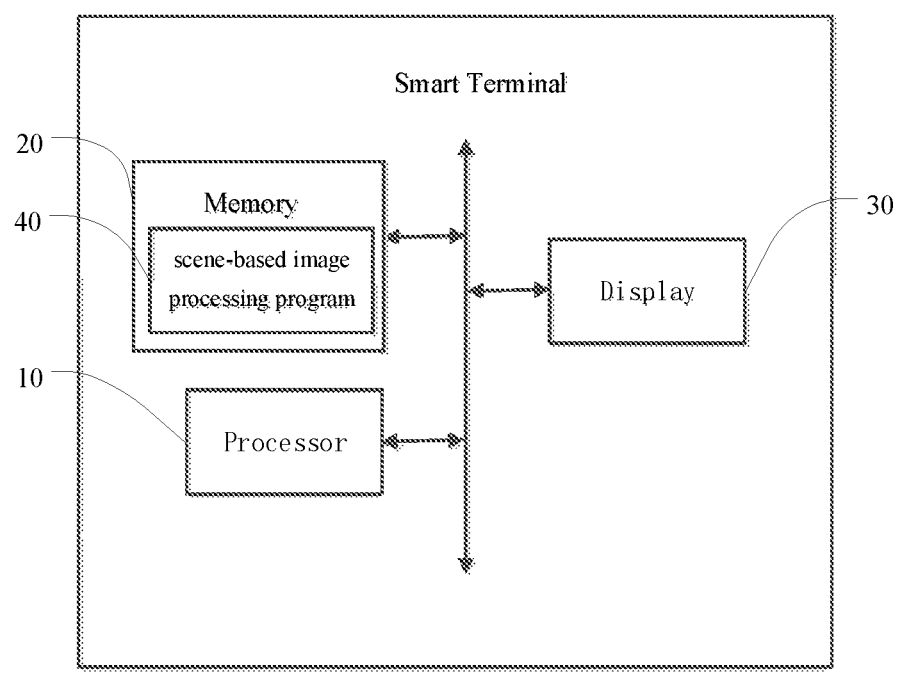
FIG. 3 illustrates a running environment schematic diagram of an embodiment of the smart terminal provided by the present disclosure.

Further, as shown in FIG. 3, based on the above-mentioned scene-based image processing method, the present disclosure also provides a smart terminal correspondingly, the smart terminal comprising: a processor 10, a memory 20, a display 30. FIG. 3 only shows part of the components of the smart terminal, but it should be understood that it is not required to implement all the components shown, and more or fewer components may be implemented instead.

In some embodiments, the memory 20 may be an internal storage unit of the smart terminal, such as a hard disk or memory 20 of the smart terminal. In other embodiments, the memory 20 may also be an external storage device of the smart terminal, such as a plug-in hard disk equipped on the smart terminal, a smart media card (SMC), a secure digital (SD) card, a flash card, etc. Further, the memory 20 may also comprise both an internal storage unit of the smart terminal and an external storage device. The memory 20 is used to store application software and various types of data installed in the smart terminal, such as the program code installed in smart terminal, etc. The memory 20 can also be used to temporarily store data that has been output or will be output. In an embodiment, a scene-based image processing program 40 is stored in the memory 20, and the scene-based image processing program 40 can be executed by the processor 10, so as to implement the scene-based image processing method in the present application.

The processor 10 in some embodiments may be a central processing unit (CPU), a microprocessor or other data processing chips, for running the program code or processing data stored in the memory 20, such as executing the scene-based image processing method, etc.

In some embodiments, the display 30 may be an LED display, a liquid crystal display, a touch control liquid crystal display, an OLED (Organic Light-Emitting Diode) touch device, etc. The display 30 is used for displaying information on a smart terminal and for displaying a visualized user interface. The components 10-30 of the smart terminal communicate with each other via a system bus.

In an embodiment, when a processor 10 executes a scene-based image processing program 40 in the memory 20, implementing the following steps:

performing decoding after acquiring video date to obtain a plurality of frame image, and performing key-frame detection to identify key-frame images;

analyzing a similarity between a content of two adjacent key-frame images, and determine whether a difference in the content of the two adjacent key-frame images is within a preset threshold;

when the difference in the content of two adjacent key-frame images is within a preset threshold, determining that the two adjacent key-frame images are a same scene, uniformly performing image feature statistics and superimposing feature information, and performing image enhancement processing on a same scene through using a same enhancement processing curve.

The analyzing a similarity between a content of two adjacent key-frame images, and determine whether a difference in the content of the two adjacent key-frame images is within a preset threshold, further comprising:

when it is determined that the difference of image content between two adjacent key-frames exceeds the preset threshold, determining that the two adjacent key-frame images are different scenes, and respectively performing image feature statistics, performing image engagement processing on image features of different scenes through a corresponding enhancement processing curve.

At an intersection of changing scenes, applying an image enhancement algorithm to smooth an enhancement processing curve of the two scenes before and after a change.

After determining that the two adjacent key-frame images are different scenes and performing image feature statistics compilation respectively, controlling feature information not to be superimposed.

When performing key-frame detection, obtaining a key-frame image through identifying a fixed flag bit in code streaming.

The key-frame is formed by intra frame compression, and a compression rate is the lowest.

The animation between the two key-frames is a transition frame or an intermediate frame, and the transition frame or the intermediate frame is created by software.

Embodiment 4

The present disclosure further provides a storage medium, wherein, the storage medium stores a scene-based image processing program, and the scene-based image processing program is executed by a processor to implement the steps of the scene-based image processing method described above.

Above all, the present disclosure discloses a scene-based image processing method, apparatus, smart terminal and storage medium, the method comprising: performing decoding after acquiring video date to obtain a plurality of frame images, and performing key-frame detection to identify key-frame images; analyzing similarity between the content of two adjacent key-frame images, and determining whether the difference in the content of the two adjacent key-frame images is within a preset threshold; when the difference in the content of the two adjacent key-frame images is within the preset threshold, determining that the two adjacent key-frame images are a same scene, uniformly performing image feature statistics and superimposing feature information, and performing image enhancement processing on a same scene through using a same enhancement processing curve. By extracting key-frame images, the present disclosure merely needs to perform video feature analysis and statistics on the key-frame images to obtain statistic information, the entire same scenes are enhanced through using a same enhancement processing curve, thereby greatly saving resources and benefiting system stability.

Certainly, the ordinary skill in the art can understand that all or part of the processes in the above-mentioned embodiment methods can be implemented by instructing relevant hardware (such as a processor, a controller, etc.) through a computer program, and the program can be stored in a computer readable storage medium, and the program can include a flow as described in the embodiment of each method. The storage medium can be a memory, a magnetic disc, an optical disc, etc.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A scene-based image processing method, wherein, the scene-based image processing method comprising:

performing decoding after acquiring video date to obtain a plurality of frame images, and performing key-frame detection to identify key-frame images;

analyzing a similarity between a content of two adjacent key-frame images, and determining whether a difference in the content of the two adjacent key-frame images is within a preset threshold;

determining the two adjacent key-frame images are a same scene when the difference in the content of the two adjacent key-frame images is within the preset threshold, performing image feature statistics on feature information of the two adjacent key-frame images and combining features in the feature information of the two adjacent key-frame images, and performing image enhancement processing on the feature information of the two adjacent key-frame images in the same scene through using a same enhancement processing curve of characteristic parameters for the feature information of the two adjacent key-frame images.

2. The scene-based image processing method according to claim 1, wherein after analyzing a similarity between a content of two adjacent key-frame images, and determining whether a difference in the content of the two adjacent key-frame images is within a preset threshold, further comprising:
 determining the two adjacent key-frame images are two different scenes when it is determined that the difference in the content of the two adjacent key-frame images exceeds the preset threshold, and respectively performing image feature statistics, and performing image engagement processing on image features of two different scenes through a corresponding enhancement processing curve.

3. The scene-based image processing method according to claim 2, wherein the scene-based image processing method further comprising:
 at an intersection of changing scenes comprising the two different scenes, applying an image enhancement algorithm to smooth an enhancement processing curve of the two different scenes before and after the change.

4. The scene-based image processing method according to claim 2, wherein the scene-based image processing method further comprising:
 after determining the two adjacent key-frame images are two different scenes, and respectively performing image feature statistics, controlling feature information not to be combined.

5. The scene-based image processing method according to claim 1, wherein the scene-based image processing method further comprising:
 when detecting a key-fame, obtaining a key-frame image through identifying a fixed flag bit in code stream.

6. The scene-based image processing method according to claim 1, wherein the key-frame is formed by intra frame compression, and a compression rate is the lowest.

7. The scene-based image processing method according to claim 1, wherein animation between the two key-frames is a transition frame or an intermediate frame, and the transition frame or the intermediate frame is created by software.

8. A scene-based image processing apparatus, wherein the scene-based image processing apparatus comprising:
 a video decoding module, used to perform decoding after acquiring video date to obtain a plurality of frame images;
 a key-frame recognition module, used to perform key-frame detection after decoding code and identify key-frame images;
 a scene analysis module, used to analyze a similarity between a content of two adjacent key-frame images, and determine whether a difference in the content of the two adjacent key-frame images is within a preset threshold;
 an image analysis module, used to perform image feature statistics on feature information of the two adjacent key-frame images a same scene and combine features in the feature information of the two adjacent key-frame images of;
 an image enhancement module, used to perform image enhancement processing on the feature information of the two adjacent key-frame images in the same scene through using a same enhancement processing curve of characteristic parameters for the feature information of the two adjacent key-frame images.

9. A scene-based image processing apparatus according claim 8, wherein the image analysis module is also used to perform image feature statistics on two different scenes respectively and control feature information not to be combined.

10. A scene-based image processing apparatus according claim 9, wherein the image enhancement module is also used to apply an image enhancement algorithm to smooth an enhancement processing curve of two different scenes before and after a change at an intersection of changing scenes comprising the two different scenes.

11. A scene-based image processing apparatus according claim 8, wherein the image enhancement module is also used to perform image engagement processing on image features of two different scenes through a corresponding enhancement processing curve.

12. A scene-based image processing apparatus according claim 8, wherein the key-frame recognition module further comprises a key-frame image acquisition unit, the key-frame image acquisition unit is used to obtain a key-frame image through identifying a fixed flag bit in code streaming during the key-frame detection.

13. A scene-based image processing apparatus according claim 8, wherein the key-frame is formed by intra frame compression, and a compression rate is the lowest.

14. A scene-based image processing apparatus according claim 8, wherein an animation between the two key-frames is a transition frame or an intermediate frame, and the transition frame or the intermediate frame is created by software.

15. A smart terminal, wherein the smart terminal comprising: a memory, a processor, and a scene-based image processing program stored on the memory and capable of running on the processor, when the scene-based image processing program is executed by the processor, performing a plurality of operations comprising:
 performing decoding after acquiring video date to obtain a plurality of frame images, and performing key-frame detection to identify key-frame images;
 analyzing a similarity between a content of two adjacent key-frame images, and determining whether a difference in the content of the two adjacent key-frame images is within a preset threshold;
 determining the two adjacent key-frame images are a same scene when the difference in the content of the two adjacent key-frame images is within the preset threshold, performing image feature statistics on feature information of the two adjacent key-frame images and combining features in the feature information of the two adjacent key-frame images, and performing image enhancement processing on the feature information of the two adjacent key-frame images in the same scene through using a same enhancement processing curve of characteristic parameters for the feature information of the two adjacent key-frame images.

16. A non-transitory storage medium, wherein the storage medium stores a scene-based image processing program, when the scene-based image processing program is executed by a processor, performing a plurality of operations comprising:
 performing decoding after acquiring video date to obtain a plurality of frame images, and performing key-frame detection to identify key-frame images;
 analyzing a similarity between a content of two adjacent key-frame images, and determining whether a difference in the content of the two adjacent key-frame images is within a preset threshold;
 determining the two adjacent key-frame images are a same scene when the difference in the content of the two adjacent key-frame images is within the preset threshold, performing image feature statistics on feature information of the two adjacent key-frame images and combining features in the feature information of the two adjacent key-frame images, and performing image enhancement processing on the feature information of the two adjacent key-frame images in the same scene through using a same enhancement processing curve of characteristic parameters for the feature information of the two adjacent key-frame images.

* * * * *